United States Patent [19]
Lawson

[11] 3,738,508
[45] June 12, 1973

[54] AUTOMATIC LOADING AND UNLOADING APPARATUS FOR WASHERS, STERILIZERS AND LIKE VESSELS

[75] Inventor: Alfred C. Lawson, Fairport, N.Y.

[73] Assignee: Sybron Corporation, Rochester, N.Y.

[22] Filed: Apr. 14, 1971

[21] Appl. No.: 133,897

[52] U.S. Cl. .................... 214/23, 198/106, 198/221
[51] Int. Cl. ........................................... B65g 25/10
[58] Field of Search ............. 214/21, 23, 25, 17 C; 198/105, 106, 221

[56] References Cited
UNITED STATES PATENTS

| | | | |
|---|---|---|---|
| 3,104,767 | 9/1963 | Bassett | 214/23 |
| 2,965,369 | 12/1960 | Acker et al. | 198/221 X |
| 3,243,059 | 3/1966 | Kalberkamp | 214/26 |
| 3,146,879 | 9/1964 | Montagino | 198/221 |
| 2,668,614 | 2/1954 | Lawson | 198/221 |
| 3,300,195 | 1/1967 | Dovovan et al. | 214/21 X |

Primary Examiner—Robert G. Sheridan
Attorney—Theodore B. Roessel

[57] ABSTRACT

The invention concerns a washer, sterilizer or like vessel and apparatus for automatically loading and unloading articles from the vessel. The apparatus includes a conveyor for bringing articles to the vessel, a transfer mechanism for moving the articles between the conveyor and vessel opening and a boom arranged to move the articles into or out of the vessel.

2 Claims, 3 Drawing Figures

INVENTOR.
ALFRED C. LAWSON
BY
Theodore B Roesel
ATTORNEY

INVENTOR.
ALFRED C. LAWSON 3,738,508

AUTOMATIC LOADING AND UNLOADING APPARATUS FOR WASHERS, STERILIZERS AND LIKE VESSELS

BACKGROUND OF THE INVENTION

The present invention relates to loading and unloading apparatus for washers, sterilizers and the like and more particular to apparatus for automatically loading and unloading such vessels wherein the apparatus is stationed wholly outside the vessel.

Modern hospitals, pharmaceutical houses, laboratories or the like require an automated system for washing and sterilizing the larger number of utensils, containers, equipment, etc. that is used during the course of its daily operation. Most efficient automatic operation of washers and sterilizers are accomplished by what is known as pass-through devices wherein the articles enter one end and exist the other. Loading mechanism in such types of washers are relatively simple in that an endless belt conveyor may be used to carry the article through the washing vessel. Pass-through sterilizers, however, present additional problems especially where steam and/or high temperature is used as the sterilizing medium. In such cases the sterilizing vessel must be sealed and accordingly loading apparatus such as an endless belt conveyor which passes through the vessel cannot be used. Attempt has been made to overcome this problem by having a separate conveyor or load receiving means within the vessel which receives the articles from an external conveyor and then delivers the articles to another external conveyor after the sterilizing process. However, this requires a mechanism within the sterilizing vessel which not only must be able to withstand the humid and high temperature environment of a steam and/or high temperature sterilizer but which must also have its moving parts readily accessible for cleaning, repair and/or replacement. Care must also be taken in the selection of materials from which such devices are made to insure that the material does not adversely react with the environment within the sterilizing vessel as in the case where the sterilizing media is a toxic gas.

Accordingly, the present invention overcomes the drawbacks of the prior art by providing both loading and unloading apparatus which is located completely outside of the vessel and extends into the vessel only during the loading or unloading process so that the apparatus is not exposed to the high temperature, humid or toxic environment within the washer sterilizer vessel.

SUMMARY OF THE PRESENT INVENTION

The present invention may be characterized in one aspect thereof by the provision in combination with a pass-through washer and/or sterilizing vessel and a conveyor for moving the articles to and from the vessel, of a loading apparatus comprising: a transfer means for transferring the articles from a load conveyor and along a guide and support track into an opening of a vessel; and a load means for moving the articles from the track into the vessel including a traversing boom adapted for pushing the articles through the opening and into the vessel.

The unloading apparatus is similar in construction to the load apparatus but is located on the unload side of the pass-through vessel wherein a boom member first is extended into the vessel for withdrawing the articles onto a guide track and thereafter a transfer means moves the articles along the guide track and onto a conveyor.

OBJECTS OF THE INVENTION

One object of the present invention is to provide loading and unloading apparatus for pass-through washers, sterilizers and like vessels which is located outside of the vessel and has no moving parts contained within the vessel during the washing and/or sterilizing cycles.

Another object of this invention is to provide loading apparatus for passthrough washers, sterilizers and like vessels having means for removing articles to be washed and sterilized from a conveyor and transferring such articles into the vessel.

A further object of the present invention is to provide a loader of the type described wherein the articles to be washed and sterilized are first removed from a conveyor system to an intermediate transfer mechanism and thereafter moved into the vessel.

Yet another object of the present invention is to provide a completely automated system for loading and unloading washers, sterilizers and like vessels.

These and other objects, advantages and characterizing features of the present invention will become more apparent on consideration of the following detailed description thereof when taken in connection with the accompanying drawings depicting the same.

DESCRIPTION OF THE PREFERRED EMBODIMENTS

Figure 1:
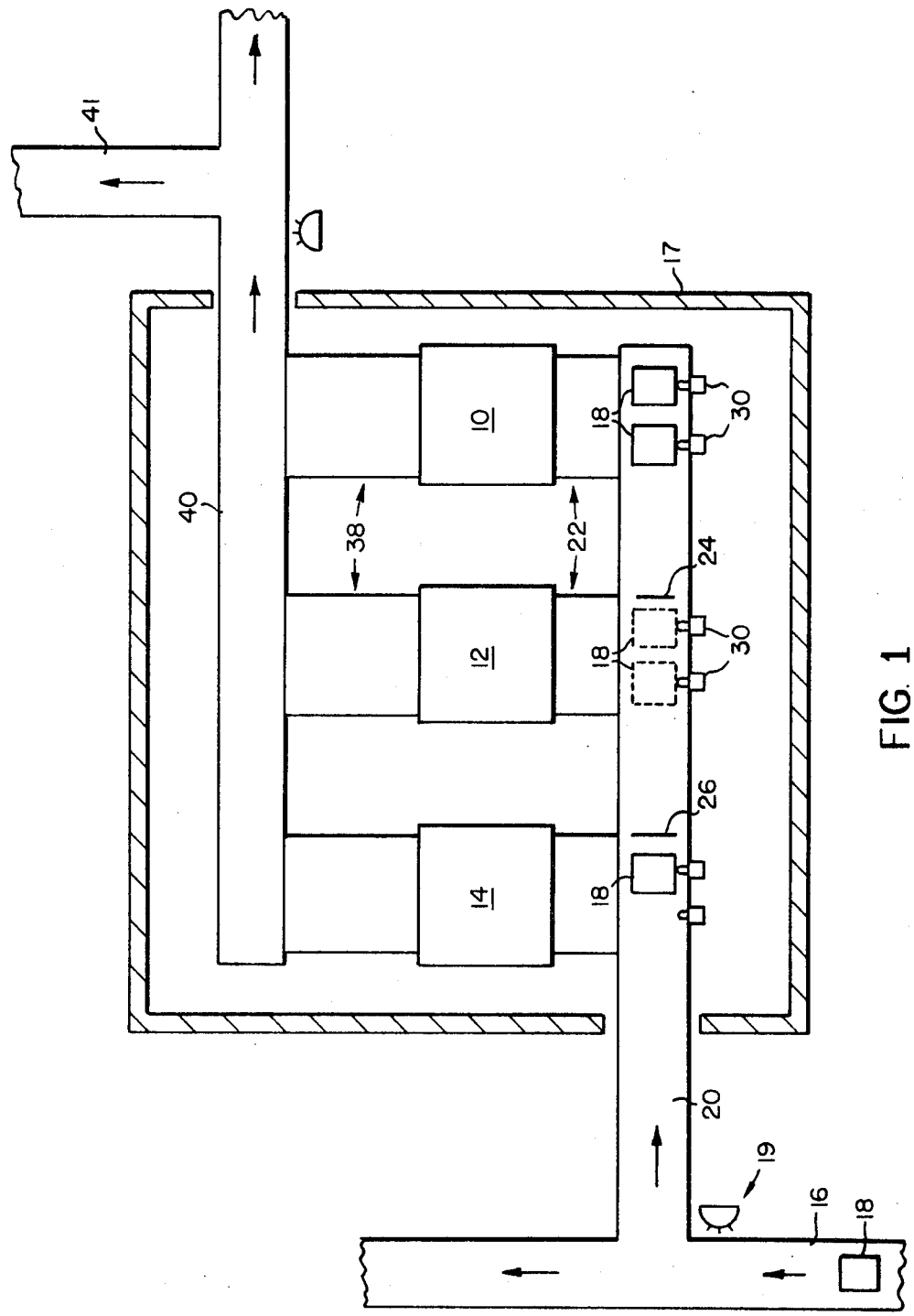
FIG. 1 is a schematic plan view of an automated washer sterilizer system employing the present invention.

Referring to the Drawings, FIG. 1 shows schematically a general plan view of an automated system employing the present invention. The system uses three vessels 10, 12 and 14 which may be either washers or sterilizers or of the type wherein both washing and sterilizing is carried out in the same vessel. While the Figure shows three such vessels, it should be appreciated that a greater or lesser number of vessels may be used as necessary depending upon the requirements of the particular hospital, pharmaceutical house, laboratory or the like.

A conveyor 16 may be used to route the articles from a source (not shown) to that room 17 or part of the building containing the washer-sterilizer apparatus. Any suitable conveyor mechanism may be used although a driven roller accumulating conveyor is preferred. The source of the articles, for example, could be a collecting and sorting room where the various articles to be washed and sterilized are sorted and packed in containers 18 which are then loaded on to the conveyor.

From conveyor 16 or other suitable transport device, containers 18 are shuttled onto a shuttle conveyor 20 which extends into room 17. Means 19 for transferring and controlling the movement of the containers from conveyor 16 to shuttle container 20 are well known in the conveyor art and form no part of the present invention. For example, such means could be a photo cell operated mechanism which is triggered by passing containers to move containers from conveyor 16 to the shuttle conveyor.

Shuttle conveyor 20 is preferably a roller conveyor for purposes described hereinbelow which may be either gravity operated or of the powered roller type. The shuttle conveyor is disposed for moving the containers 18 along a path of travel which is normal to the path through the pass-through vessels and spaced from the load openings of the vessels.

The loading apparatus of the present invention, generally indicated at 22, is located in the space between each vessel and the shuttle conveyor, with a portion of the loader extending beneath the shuttle. The loader moves containers, which have been accumulated (in a manner set forth hereinbelow) on the shuttle conveyor in front of the vessels, from this accumulate position on the conveyor across the space between the conveyor and the vessel, and into the vessel.

Figure 2:
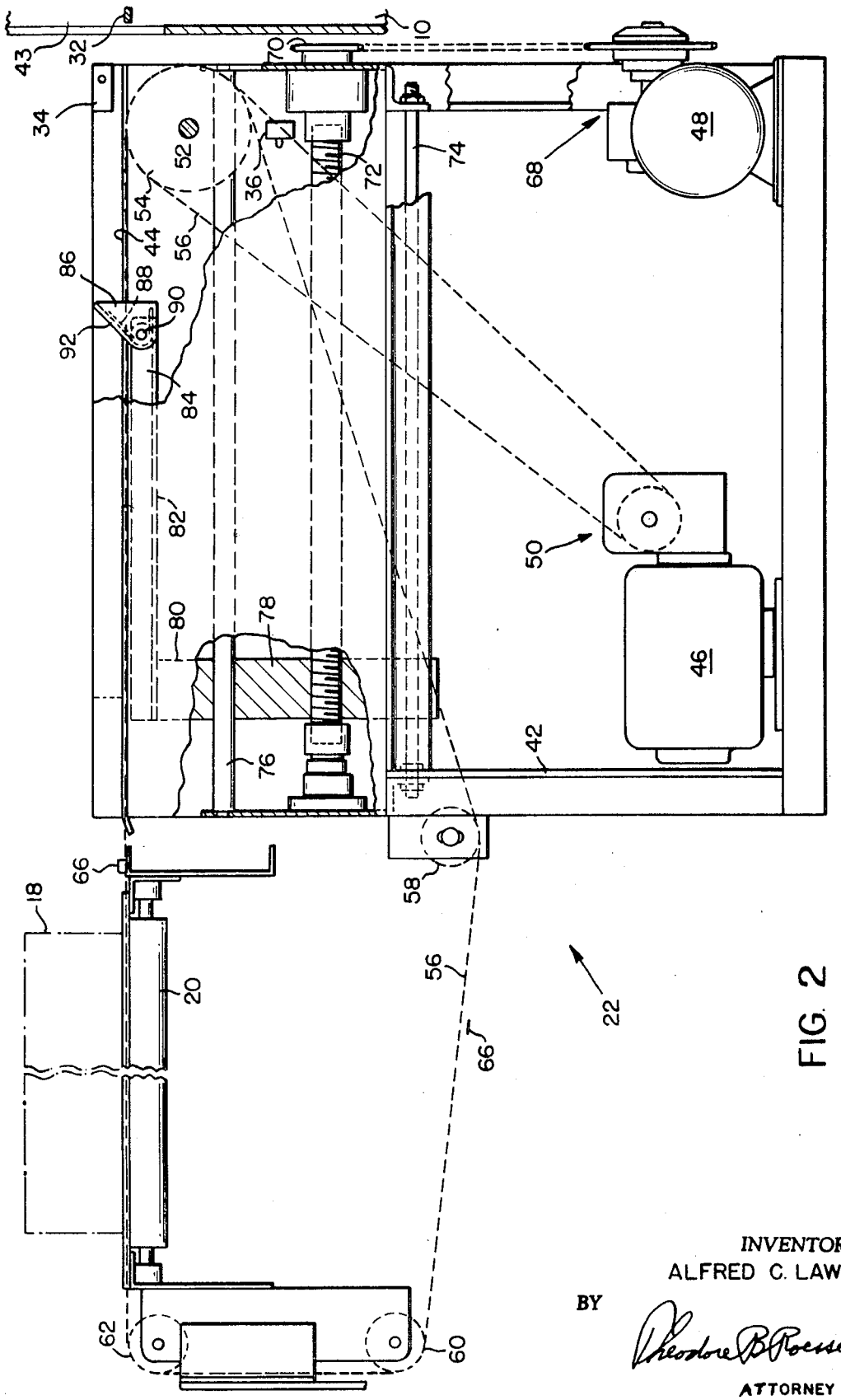
FIG. 2 is a side elevation view partly broken away and in section of the loading apparatus of the present invention.

As shown in FIG. 2, loader 22 includes a stand 42 which supports a pair of spaced, parallel rail members 44 at the level of the vessel opening 43 and more particularly at the level of any suitable article receiving means 32 within the vessel. These rails 44 support and guide containers 20 as the containers are moved across the loader and into the vessel.

Figure 3:
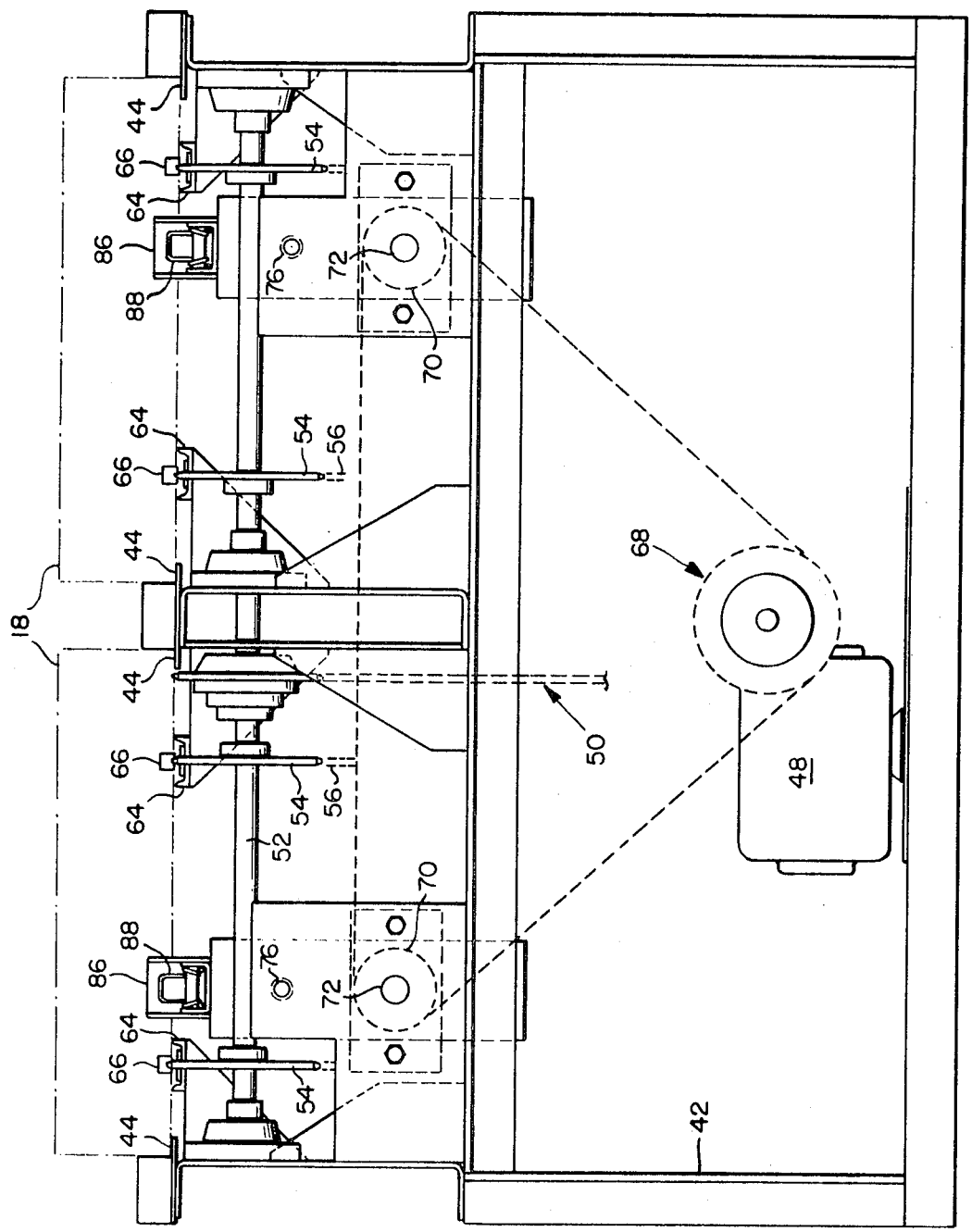
FIG. 3 is a front elevation view of the apparatus shown in FIG. 2.

FIG. 3 shows that stand 42 carries two sets of such rails so that two containers may be moved side by side into the washer and/or sterilizer vessel. In like respect, other portions of the loader are also duplicated as will be readily apparent from the view shown in FIG. 3. To simplify the description, however, duplicate parts performing identical functions have been given the same reference numeral but otherwise, the device and its operation will be described in the singular as if this side by side symmetry did not exist.

Stand 42 also supports the drive motors 46,48 which drive the load transfer mechanism as set out hereinbelow. Drive motor 46 operating through any suitable drive means such as a chain and sprocket indicated at 50 (FIG. 2) drives a shaft 52 which extends substantially the full width of the loader (FIG. 3.) Keyed to this shaft are a pair of sprockets 54 which are located inboard of the spaced rail members 44. As viewed in FIG. 2, each sprocket 54 drives a transfer chain 56 which runs in a clockwise direction in a closed loop extending from sprockets 54, over idlers 58, 60 and 62 back to the sprockets. Thus, one terminus of the closed loop is represented by sprockets 54. Idlers 60 and 62 are spaced outwardly from stand 42 to carry the transfer chain beneath shuttle conveyor 20 and between adjacent rollers of the shuttle conveyor. In addition, each transfer chain runs along a horizontal guide channel 64, best shown in FIG. 3 located just below the level of rails 44 which prevents the chain from sagging as it moves past the rails.

Attached to each transfer chain 56, preferably at 180° intervals, are pusher dogs 66 which extend above the level of rails 44 as the transfer chains move along the guide channels. With this arrangement, these pusher dogs will engage the bottom of a container on the shuttle conveyor when the transfer chain is driven to move the container from the conveyor, onto the rails 44 and along these rails into the opening 43 of the vessel.

Second drive motor 48 is reversable and operating through any suitable means such as chain and sprocket drive generally indicated at 68 (FIG. 3), drives a sprocket wheel 70. Sprocket wheel 70 in turn drives a lead screw 72 which is journaled adjacent the front and rear of frame 42 as best seen in FIG. 2. Above and below the lead screw and extending parallel with the axis of the lead screw is, respectively, a lower guide rod 74 and an upper guide rod 76. These guide rods slidably support an upright traveling member or slave nut 78 which is driven horizontally by lead screw 72. The traveling member supports at its upper end 80, a boom 82 in cantilever fashion. Journaled to the forward end 84 of the boom is a pusher element 86 which is normally biased to an upright position, as shown, extending above the plane of rails 44 so that the pusher element may engage against a container riding on the rails. While pusher 86 is biased to this upright position by a spring 88, the pusher element may be rotated in a clockwise direction as viewed in FIG. 2 about its axis 90 whenever a container engages the rear surface 92 of the pusher for purposes set out hereinbelow.

In operation, means 19 operates to transfer containers 18 from conveyor 16 onto shuttle conveyor 20. When two containers have accumulated in front of vessel 10 as shown in FIG. 1, a stop 24 is raised to prevent the passage of additional containers until these first two have been loaded into vessel 10. This stop 24 forms no part of the present invention and means for preventing movement of articles on a roller conveyor are well known in the art. When the first two containers have been transferred by loading apparatus 22 from the shuttle conveyor and into vessel 10, stop 24 is dropped to permit the accumulation of two more containers in front of vessel 10 and the stop 24 again raised. This continues until such time as vessel 10 is fully loaded and begins operation. At this point, stop 24 is raised to permit the accumulation of two containers in front of vessel 12 as shown in dotted line in FIG. 1. When this occurs, a stop 26 is raised to prevent further accumulation of containers in front of vessel 12 until the containers which have been so accumulated have been transferred by the loading apparatus into vessel 12. Stop 26 is then lowered to permit two more containers to accumulate in front of vessel 12 and the raising and lowering of stops continues until all the vessels are filled to capacity and are in operation. When this occurs, means 19 for transferring containers from conveyor 16 onto shuttle conveyor 20 prevents such transfer until one or more of the vessels are empty and ready to receive containers.

The operation of the loading apparatus will be described as beginning when two containers 18 are occupying the accumulation positions on the shuttle conveyor 20 in front of vessel 10 as shown in FIG. 1. with the containers in this position, any suitable means such as a pair of limit switches 30 closes a circuit to activate drive motor 46. Drive motor 46 operating through chain and sprocket drive 50, moves transfer chains 56 in a clockwise direction as viewed in FIG. 2 over sprockets 54, idler sprockets 58,60,62 and through guide channel 64. As the chain is moved in this clockwise direction, one of the dogs 66 is eventually engaged against the rear side of the container and the container moved by this engagement from the roller conveyor onto and along rails 44. As the container is moved along the rails, the rearward end 92 of pusher 86 is engaged by the container which rotates the pusher out of the container path of travel so that the container may pass over the pusher. The chain 56 continues to carry container 20 along rails 44 to a first position wherein the container is passed off of the rails and partially into the vessel opening. Rack 32 in the vessel which is at the same height as rails 44 receives the containers as they move off of the rails and into the vessel. At this point, dog 66 rotates around sprocket 54 and disengages from the container.

As the container is moved along rails 44 by the chain and just prior to entering the vessel opening 43, the container actuates another limit switch 34. Closing limit switch 34 actuates suitable control means such as a stepping switch (not shown) which allows the container to proceed if the vessel door is open. As the container passes onto rack 32 within the vessel, it clears limit switch 34 which stops drive motor 46 and starts drive motor 48. At this point, the container is only partly in the vessel.

Motor 48 acting through chain and sprocket drive 68 and sprocket 70 drives worm 72 to move the upright slave nut 78 and the cantilevered boom 82 to the right as viewed in FIG. 2. Pusher element engages the rear of the container and pushes the container completely through the vessel opening further onto rack 32. When the pusher has reached its forward limit of travel, it engages still a third limit switch 36 which causes drive motor 48 to reverse to return the pusher to the position shown in FIG. 2. Any suitable means such as a limit switch (not shown) may be provided to stop motor 48 when the pusher has been returned to the position shown in FIG. 2.

If, in the meantime, two additional containers 18 have been accumulated in front of vessel 10 as shown in FIG. 1, the actuation of limit switches 30 coupled with the return of the pusher will begin the loading cycle again. Loading these additional containers into the vessel will simply push the previously loaded containers further into the vessel. This loading procedure continues until the vessel is loaded and the vessel door closed.

As an alternative to this loading method, motor 48 can be started as soon as limit switch 34 is closed. With this arrangement there is, for a short period of time, simultaneous movement of both the chain and the pusher. However, the pusher is purposely driven at a slower speed than the chain so that the pusher will not engage the container until the dog rotates around sprocket 54 and disengages from the container. Since chain 56 preferably has only two dogs 66 located at 180° intervals, it is a simple matter to control or program drive motor 46 to stop when dog 66 rotates around sprocket 54 and disengages from the container. At this point, pusher element 86 engages the rear of the container and pushes the container to a second position completely through the vessel opening and onto rack 32. When the pusher has reached the forward limit of travel, it engages limit switch 36 which causes drive motor 48 to reverse to return the pusher to the position shown in FIG. 2. As the pusher is being returned to the position shown in FIG. 2, drive motor 46 may be actuated to move any containers which have accumulated in the meantime, off of the roller conveyor and across rails 44 into the vessel opening. Thus, by the time pusher has returned to its start position, two additional containers are in place ready to be moved through the opening and into the vessel. Should chain 56 be moving a container along rails 44 as the boom 82 is being returned, the container will engage the pusher surface 92 to move the pusher out of the way against the bias of spring 88 as the container and pusher move past other. If the vessel is capable of receiving additional containers, the container now on rails 44 will be moved into the vessel in the manner described hereinabove. The previously loaded containers will simply be pushed further into the vessel by the after loaded containers.

The unload apparatus, generally indicated at 38 (FIG. 1), which operates at the end of the wash and/or sterilize cycle to remove containers from the vessel, is very similar in construction to the load devices as described hereinabove.

Accordingly, the construction and operation of the unloading apparatus will not be described in detail as modifying the loading apparatus 22 to produce the unloading apparatus is within the skill of the art. It is sufficient for purposes of the present invention merely to say that while the loading and unloading apparatus are similar in construction, the unloading apparatus operates in the reverse of the loading apparatus. In this respect, the pusher elements of the unloader are pulling elements, that is, they are moved into the vessel beneath the container, until the far end of the container is engaged and the drive motor then reversed to pull the containers from the vessel and onto the rails of the unloading apparatus. The transfer chains of the unloader then move the containers along the rails and onto the unload shuttle conveyor 40. From the unload shuttle conveyor, the now washed and/or sterilized containers are transferred onto a conveyor 41 for routing to a point of use.

While the invention has been described as if the loading and unloading conveyors 20 and 40 respectively moved the containers along a path of travel normal to the path through the vessels, it is considered within the skill of the art to have these conveyors disposed in line with the direction of loading. In this respect for example, load conveyor 20 could be disposed to feed containers in line towards the vessel opening to a point where the containers can be picked-up by dog 66 on the endless chain and moved into the vessel as described hereinabove.

Thus, it should be appreciated that the present invention accomplishes its intended objects in providing a loading apparatus, particularly for washers, sterilizers and like vessels in which no movable part of the apparatus remains within the vessel and which may transfer articles from a conveyor mechanism and into the vessel.

Having thus described the invention, what is claimed as new is:

1. Apparatus for loading articles into washers, sterilizers and the like vessels comprising in combination:
   a. a guide and support track located in front of and spaced from an opening of the vessel for receiving an article to be loaded;
   b. an endless chain supported for movement in a closed loop, a portion of which loop extends along a path of travel beneath said track, one end of said loop being defined by a sprocket in front of and spaced from said vessel opening so as to define a space between said loop end and vessel opening;

c. a dog on said chain extending upwardly and engageable against a bottom portion of an article on said track;
d. first drive means driving said chain about said loop in one direction only for engaging said dog against the article and moving the article along said track and across said space to a first position partially through said vessel opening, said dog thereafter disengaging from the article at said loop end, as said chain passes over said sprocket;
e. a moveable cantilevered boom supported in a rest position outside of said vessel and beneath said track for reversable movement into and out of the vessel opening, a portion of said boom extending upwardly and engageable against a bottom portion of an article on said track;
f. reversable means for driving said boom to engage said boom portion against and move the article from said first position through said opening and into said vessel, said reversable means thereafter operating to move said boom out of said vessel; and
g. switch means engagable by the article for deactuating said first drive means and actuating said reversable drive means when the article is at said first position.

2. Apparatus as set forth in claim 1 in which said second means is activated while said first means is operating and before the article is moved across said space, said second means being adapted to drive said boom at a speed slower than said first means drives said chain whereby said boom engages the article after disengagement of said dog.

* * * * *